(12) United States Patent
Mandula (10) Patent No.: US 10,866,398 B2
(45) Date of Patent: Dec. 15, 2020

(54) METHOD FOR OBSERVING A SAMPLE IN TWO SPECTRAL BANDS, AND AT TWO MAGNIFICATIONS

(71) Applicant: Commissariat A L'Energie Atomique et aux Energies Alternatives, Paris (FR)

(72) Inventor: Ondrej Mandula, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 16/722,311

(22) Filed: Dec. 20, 2019

(65) Prior Publication Data

US 2020/0201016 A1     Jun. 25, 2020

(30) Foreign Application Priority Data

Dec. 22, 2018   (FR) ..................................... 18 74082

(51) Int. Cl.
*G01J 3/00* (2006.01)
*G02B 21/18* (2006.01)
(Continued)

(52) U.S. Cl.
CPC ................ *G02B 21/18* (2013.01); *G01J 3/12* (2013.01); *G01J 3/2823* (2013.01);
(Continued)

(58) Field of Classification Search
CPC ...... G02B 21/18; G02B 21/36; G02B 21/025; G02B 21/082; G01J 3/12; G01J 3/2823; G01J 3/26
See application file for complete search history.

(56) References Cited

U.S. PATENT DOCUMENTS

2011/0315878 A1*  12/2011  Vizgaitis ............ G02B 17/0832
                                                                    250/332
2016/0103311 A1    4/2016  Ito et al.
(Continued)

FOREIGN PATENT DOCUMENTS

WO    WO 2017/204919 A1    11/2017

OTHER PUBLICATIONS

French Preliminary Search Report dated Oct. 28, 2019 in French Application 18 74082 filed on Dec. 22, 2018 (with English Translation of Categories of Cited Documents & Written Opinion), 11 pages.

*Primary Examiner* — Abdullahi Nur
(74) *Attorney, Agent, or Firm* — Oblon, McClelland, Maier & Neustadt, L.L.P.

(57) ABSTRACT

Device for observing a sample, comprising:
a light source configured to emit an incident light wave in a first spectral band and in a second spectral band, the first spectral band being different from the second spectral band;
an image sensor comprising a first group of pixels, which are sensitive to the first spectral band, and a second group of pixels, which are sensitive to the second spectral band;
a holder configured to hold the sample in a holder plane, the holder plane lying between the light source and the image sensor, such that when the sample is held by the holder, under the effect of its illumination by the incident light wave, a light wave of interest propagates to the image sensor;
the device being configured to direct, to the image sensor, a first component of the light wave of interest, in the first spectral band, and a second component of the light wave of interest, in the second spectral band.

13 Claims, 7 Drawing Sheets

(51) Int. Cl.
  *G01J 3/12*   (2006.01)
  *G01J 3/28*   (2006.01)
  *G02B 21/02*  (2006.01)
  *G02B 21/08*  (2006.01)
  *G02B 27/10*  (2006.01)

(52) U.S. Cl.
  CPC ......... *G02B 21/025* (2013.01); *G02B 21/082* (2013.01); *G02B 27/1006* (2013.01); *G01J 2003/1213* (2013.01)

(56) References Cited

U.S. PATENT DOCUMENTS

| | | |
|---|---|---|
| 2017/0343825 A1 | 11/2017 | Sinha et al. |
| 2017/0363849 A1 | 12/2017 | Doric et al. |
| 2018/0329195 A1 | 11/2018 | Ito et al. |
| 2019/0204609 A1 | 7/2019 | Sinha et al. |

* cited by examiner

METHOD FOR OBSERVING A SAMPLE IN TWO SPECTRAL BANDS, AND AT TWO MAGNIFICATIONS

TECHNICAL FIELD

The field of the invention is imaging for observing a sample. More precisely, the invention allows two images of a sample, with two different magnifications, to be formed without moving the sample or an optical system.

PRIOR ART

Conventional microscopy generally employs various objectives, which define various magnifications, so as to allow the magnification with which a sample is observed to be chosen. It is thus possible to privilege the field of observation, by choosing a low magnification, or the visualization of details of the sample, by choosing a high magnification. However, conventional microscopes do not allow two images of a given sample, at two different magnifications, to be obtained simultaneously.

Document WO2017115048 describes a device and method allowing two images of a sample to be obtained, with and without magnification respectively. In one configuration, the sample is moved between two different positions. In another configuration, two images, showing two different portions of the sample, are formed simultaneously.

Document WO2018060619 describes a device allowing a sample to be observed in a lensless imaging configuration, the observed field being large. This means a zone of the observed field may be selected. The device then allows the selected zone to be zoomed-in on using a conventional imaging modality employing an objective. The passage between the image formed with a large field of observation and the zoomed-in portion of the image requires a movement either of the sample, or of the objective. This device does not allow the same portion of the sample to be observed simultaneously.

The invention aims to remedy the drawbacks of the documents described above. It notably allows two images of a given portion of a sample to be formed simultaneously, with two different magnifications respectively.

SUMMARY OF THE INVENTION

A first subject of the invention is a device for observing a sample, comprising:
- a light source configured to emit an incident light wave in a first spectral band and in a second spectral band, the first spectral band being different from the second spectral band;
- an image sensor comprising a first group of pixels, which are sensitive to the first spectral band, and a second group of pixels, which are sensitive to the second spectral band;
- a holder configured to hold the sample in a holder plane, the holder plane lying between the light source and the image sensor, such that when the sample is held by the holder, under the effect of an illumination by the incident light wave, a light wave of interest propagates to the image sensor, said light wave of interest being the result of the propagation of the incident light wave through the sample or from reflection of the incident light by the sample;
- a first splitter, placed between the holder plane and the image sensor, so as:
  - to transmit a first component of the light wave of interest through a first optical channel, the first optical channel extending to a second splitter;
  - to reflect a second component of the light wave of interest to a second optical channel that is different from the first optical channel, the second optical channel extending to the second splitter;
- a first filter and a second filter, which are placed downstream of the first splitter in order to filter the first component in the first spectral band and the second component in the second spectral band, respectively;
- a first optical system, which defines a first magnification and which at least partially lies in the first optical channel, and a second optical system, which defines a second magnification and which at least partially lies in the second optical channel;
- the second splitter being placed between the first splitter and the image sensor, and arranged so as to recombine the first component and the second component, such that downstream of the second splitter, the first component and the second component propagate to the image sensor parallel to one and the same propagation axis.

Thus, the image sensor is able to acquire an image representative of the first component of interest, which is detected by the first group of pixels, and of the second component of interest, which is detected by the second group of pixels.

By optical channel, what is meant is a space through which a light wave propagates. An optical channel may comprise optical elements, for example a filter or a lens or an objective.

The terms upstream/downstream are to be understood with respect to the direction of propagation of the light.

According to an embodiment, the device comprises a processing unit programmed to form:
- a first image from the first group of pixels;
- a second image from the second group of pixels.

According to an embodiment, the device comprises an infinity corrected objective placed between the holder plane and the first splitter, and:
- a first tube lens lying in the first optical channel, the first tube lens forming, with the objective, the first optical system;
- a second tube lens lying in the second optical channel, the second tube lens forming, with the objective, the second optical system.

According to an embodiment, the first splitter comprises a half-silvered mirror and/or wherein the second splitter comprises a half-silvered mirror.

According to an embodiment, the second optical channel comprises mirrors, so as to direct the second component, i.e. the component reflected by the first splitter, to the second splitter.

According to an embodiment, the holder plane finds (i-e separates) two half-spaces, such that:
- the light source and the image sensor belong to two different half-spaces, respectively;
- or the light source and the image sensor belong to the same half-space.

According to an embodiment, the first magnification is strictly higher or strictly lower than the second magnification.

A second subject of the invention is a method for observing a sample using a device according the first subject of the invention, the method comprising:
- placing the sample on the holder;

illuminating the sample using the light source;
acquiring an image with the image sensor;
from the acquired image, forming a first image of the sample using the first groups of pixels, and forming a second image of the sample using the second group of pixels;
such that
the first image shows the sample at the first magnification defined by the first optical system;
the second image shows the sample at the second magnification defined by the second optical system.
According to an embodiment,
the first optical system defines a first object plane and a first image plane, and wherein the sample lies in a sample plane;
the image sensor defines a detection plane;
the method being such that:
the sample plane is offset with respect to the first object plane by a first object defocus distance smaller than 1 mm;
and/or the detection plane is offset with respect to the first image plane by a first image defocus distance smaller than 1 mm;
such that the first image is a defocused image of the sample.

By image plane and object plane, what is meant is planes conjugated by the optical system.

According to an embodiment, the method also comprises reconstructing a complex image of the first component from the defocused first image.

According to an embodiment:
the second optical system defines a second object plane and a second image plane, and wherein the sample lies in a sample plane;
the image sensor defines a detection plane;
the method being such that:
the sample plane is offset with respect to the second object plane by a second object defocus distance smaller than 1 mm;
and/or the detection plane is offset with respect to the second image plane by a second image defocus distance smaller than 1 mm;
such that the second image is a defocused image of the sample.

According to an embodiment, the method also comprises reconstructing a complex image of the second component from the defocused second image.

According to an embodiment, the light source simultaneously emits an incident light wave in the first spectral band and in the second spectral band, such that the first image and the second image are formed simultaneously from one and the same image acquired by the image sensor.

According to an embodiment, the light source successively emits an incident light wave in the first spectral band and in the second spectral band, such that the first image and the second image are formed successively from two images successively acquired by the image sensor.

Other advantages and features will become more clearly apparent from the following description of particular embodiments of the invention, which are given by way of nonlimiting example, and which are shown in the figures listed below.

DESCRIPTION OF PARTICULAR EMBODIMENTS

Figure 1A:
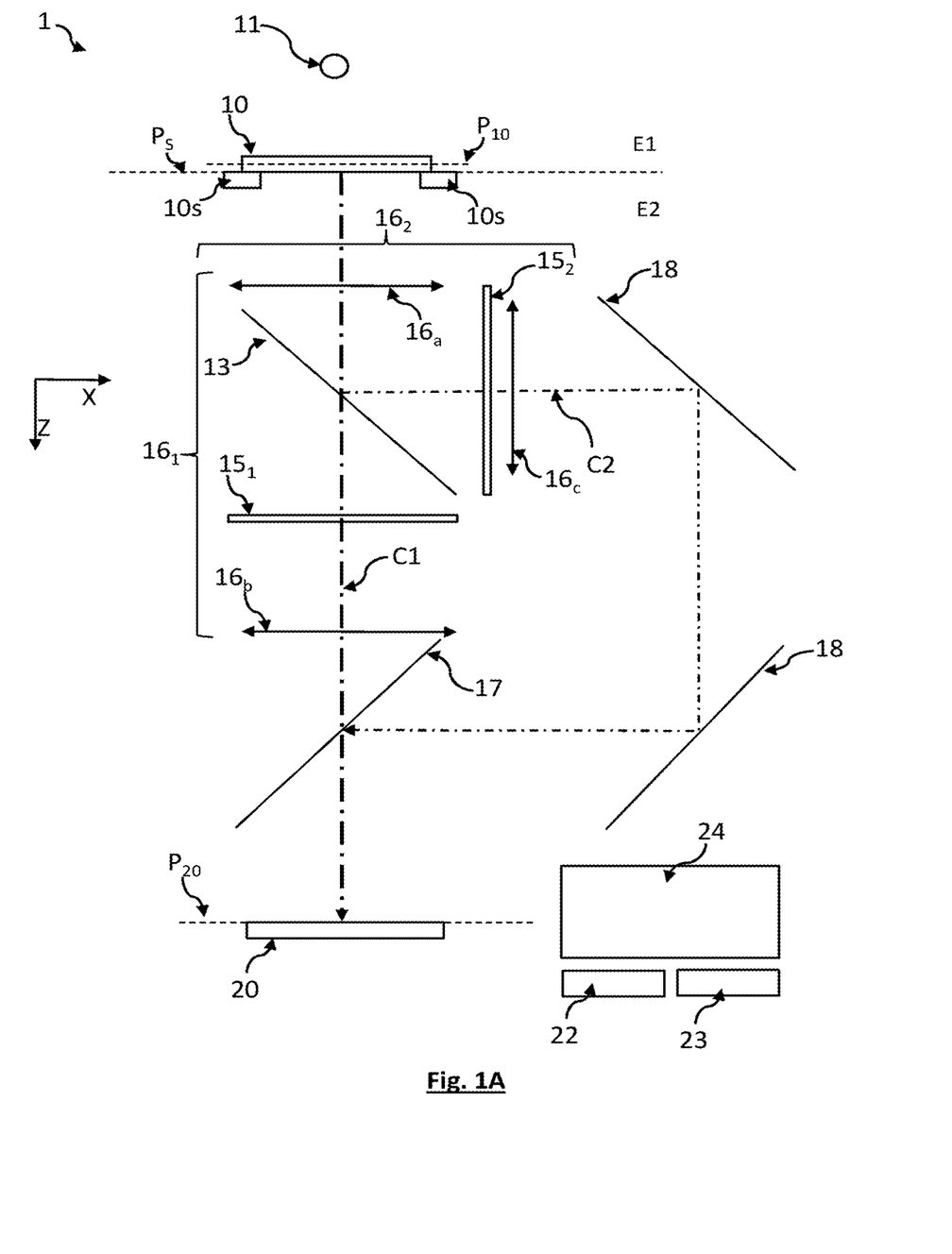
FIG. 1A shows an example of a device according to invention, in a transmissive configuration.

FIG. 1A shows a device 1 according to the invention. The device comprises a light source 11. The light source 11 is configured to emit a light wave, called the incident light wave 12, which propagates to a sample 10. The sample 10 is placed on a sample holder 10s. A first optical system $16_1$ lies between an image sensor 20 and the sample 10. The first optical system $16_1$ defines a first magnification $G_1$. A second optical system $16_2$ lies between the image sensor 20 and the sample 10. The second optical system $16_2$ defines a second magnification $G_2$. One objective of the invention is to form, on the image sensor 20, and preferably simultaneously, various images of the same portion of the sample, at different magnifications respectively.

The light source 11 may be a white light source, or be composed of elementary light sources, each elementary source emitting in various spectral bands. The light source is configured to emit the incident light wave 12 in at least a first spectral band $\Delta_1$ and a second spectral band $\Delta_2$. The first spectral band $\Delta_1$ and the second spectral band $\Delta_2$ may be emitted simultaneously, this being a preferred configuration. This is notably the case when the light source is a white light source, or, generally, when the light source emits in a spectral band $\Delta$ encompassing the first spectral band $\Delta_1$ and the second spectral band $\Delta_2$. The light source is for example an LED source (LED standing for light-emitting diode).

The configuration shown in FIG. 1A is a so-called transmissive configuration, in which the sample is placed between the light source 11 and the image sensor 20. The sample holder 10s is configured to form a holder plane $P_S$, in which or on which the sample 10 lies when it is placed on the holder 10s. In the transmissive configuration, the holder plane $P_S$ defines two half-spaces E1 and E2. The light source 11 belongs to one half-space E1, whereas the image sensor 20 belongs to the other half-space E2. A reflective configuration, in which the light source 11 and the image sensor 20 belong to the same half-space E1, is shown in FIG. 1C.

Under the effect of the illumination by the incident light wave 12 emitted by the light source 11, the sample 10 transmits a light wave 14, called the light wave of interest, the latter propagating to the image sensor 20, parallel to a first propagation axis Z. The sample 10 must be transparent or translucent enough for the light wave of interest 14 to be exploitable.

The sample 10 may be a liquid, a biological liquid containing particles for example. The term "particle" for example designates biological particles, cells or microorganisms for example. It may also designate droplets of an emulsion, or microbeads used in certain biological protocols. It may also designate bubbles of air or of another gas bathing in a solid or liquid medium. It may also designate liquid or solid particles in suspension in a gas. Generally, the particles are micrometric or millimetric in size. This means that the particles are inscribed in a disc or a sphere the radius of which is smaller than or equal to a few microns, typically 10 µm or 100 µm, or a few millimetres, 1 or 2 mm for example. In one example of an application (see FIGS. 3A to 3D) the particles are spermatozoa. Other examples of particles may be blood particles, for example white blood cells or red blood cells. The sample may also contain cells bathing in a culture medium.

The sample may also be solid. It may be a question of a dry content of a biological fluid, blood for example. It may also be a thin slice of tissue, such as those of pathology slides. In this case, the slice is sufficiently thin to be able to be observed in transmission. Its thickness may notably be comprised between 10 µm and 100 µm.

The sample may also be a culture medium, such as agar jelly, on which bacteria or bacterial colonies are developing.

Preferably, the incident light wave 12 illuminates an area of sample larger than 1 mm². The area of sample illuminated may be comprised between 1 mm² and 30 or 40 mm². Hence, the sample may be observed with a large field of observation.

The device 1 comprises a first splitter 13, here a half-silvered mirror, configured to transmit a first component $14_1$ of the light wave of interest 14 parallel to the first propagation axis Z. For example, the first splitter 13 allows 50% of the light wave of interest 14 to be transmitted along the first propagation axis Z. By to transmit, what is meant is that the light wave propagates, upstream and downstream of the sample, along the same propagation axis. The first splitter 13 reflects a second component $14_2$ of the light wave of interest 14 transversely to the axis Z, and for example along a second axis X perpendicular to the first axis Z. In the example shown, the second component $14_2$ of the light wave of interest 14, i.e. the component reflected along the second axis X, corresponds to 50% of the light wave of interest 14. In this example, the second axis X is perpendicular to the first axis Z.

The device 1 is configured such that the first and second components of the light wave of interest that propagate downstream of the first splitter are contained in the first spectral band $\Delta_1$ and in the second spectral band $\Delta_2$, respectively. The terms upstream/downstream are to be interpreted with respect to the direction of propagation of the light, from the light source 11 to the image sensor 20. The device 1 comprises a first spectral filter $15_1$, and a second spectral filter $15_2$, which are placed downstream of the first splitter 13. In this example, the first filter $15_1$ and the second filter $15_2$ are bandpass filters, so as to transmit only the first spectral band $\Delta_1$ and the second spectral band $\Delta_2$, respectively. Thus:

downstream of the first filter $15_1$, the first component $14_1$ of the light wave of interest 14 lies in the first spectral band $\Delta_1$;

downstream of the second filter $15_2$, the second component $14_2$ of the light wave of interest 14 lies in the second spectral band $\Delta_2$.

The bandwidth of the first spectral band $\Delta_1$ and of the second spectral band $\Delta_2$ is preferably narrower than or equal to 100 nm, or even than 50 nm. By bandwidth, what is meant is the full width at half maximum of a spectral band. Preferably, the first spectral band $\Delta_1$ and the second spectral band $\Delta_2$ do not overlap, or do so only marginally. This means that in case of overlap, less than 5% or less than 1% of the intensity of each component is found in the range of overlap.

In the example shown in FIGS. 1A to 1D:

the first spectral band $\Delta_1$ is centred on the wavelength 630 nm, which is in the blue spectral domain, and has a spectral width of 20 nm or 40 nm;

the second spectral band $\Delta_2$ is centred on the wavelength 450 nm, which is in the red spectral domain, and has a spectral width of 20 nm or 40 nm.

The device 1 comprises a first optical system $16_1$ defining a first magnification $G_1$. The first magnification may be lower or higher than 1, or equal to 1. In the example shown in FIGS. 1A to 1D, the first optical system $16_1$ is subdivided into a first optical component $16_a$ and a second optical component $16_b$. The first optical component is an infinity corrected objective (or lens), i.e. an objective (or lens) placed in a configuration such that its focal point is at infinity. It is placed upstream of the first splitter 13. Downstream of the objective $16_a$, the light wave of interest 14 is formed of beams parallel to the first propagation axis Z. The second optical component $16_b$ is, in this example, a tube lens. The magnification of the first optical system $16_1$, also designated by the term first magnification, depends on the focal length of the tube lens $16_b$. For example, if a tube lens of focal length $f_1=75$ mm (first focal length) is used, the magnification of the first optical system $16_1$ is equal to 4. If a shorter focal length is used, the first magnification decreases. If a longer focal length is used, the first magnification increases. The tube lens $16_b$ may be removable, this allowing the first magnification $G_1$ to be adjusted.

The device 1 comprises a second optical system $16_2$, defining a second magnification $G_2$, which is preferably different from the first magnification $G_1$. In the examples shown in FIGS. 1A to 1D, the second optical system $16_2$ comprises the first optical system $16_a$ described above (infinity corrected objective) and a third optical component $16_c$, the latter also being a tube lens. It is a question of a tube lens of focal length $f_2=200$ mm (second focal length). Thus, the second optical system $16_2$ has a second magnification $G_2$ equal to 11.

The fact that the first and second optical systems $16_1$, $16_2$ are each formed by an association of an infinity corrected objective and of a tube lens allows optical components to be placed between the objective and each tube lens. It is in this example a question of the first splitter 13 and of the filters $15_1$ and $15_2$.

The device 1 comprises a second splitter 17, placed between the first optical system $16_1$ and the image sensor 20. The second splitter 17 is also placed between the first splitter 13 and the image sensor 20. The second splitter 17 may be similar to the first splitter 13. The second splitter 17 transmits a proportion, for example 50%, of the first component $14_1$ of the light wave of interest 14 transmitted by the first splitter 13 and propagating along the first propagation axis Z. The second splitter 17 reflects, to the image sensor 20, a proportion, for example 50%, of the second component $14_2$ of the light wave of interest 14. The second splitter 17 is configured such that, downstream of the latter, the first and second components of the light wave of interest propagate parallel to each other, about the same propagation axis, in the present case the axis Z, to the image sensor 20. Thus, downstream of the second splitter 17, the first and second components of the light wave of interest are coaxial.

Figure 1B:
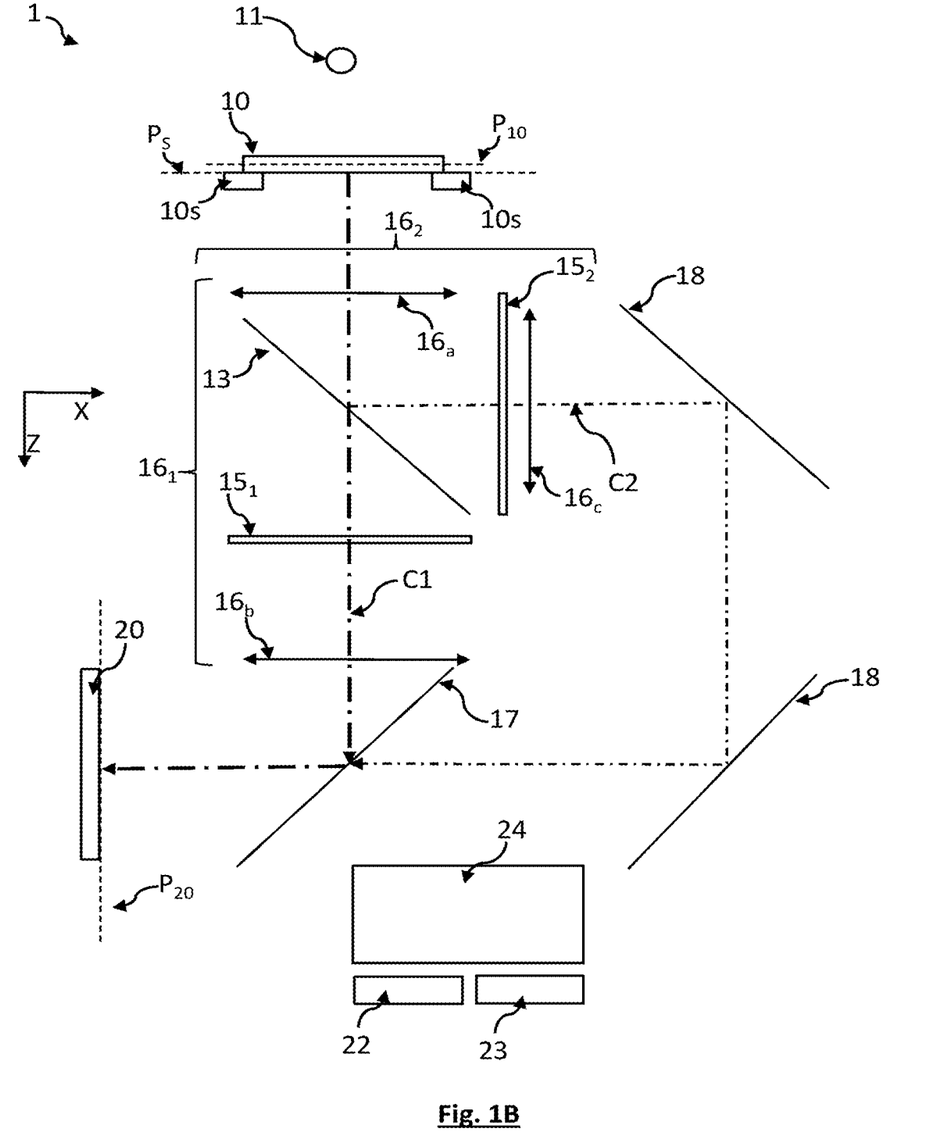
FIG. 1B shows a variant of FIG. 1A.
Figure 1C:
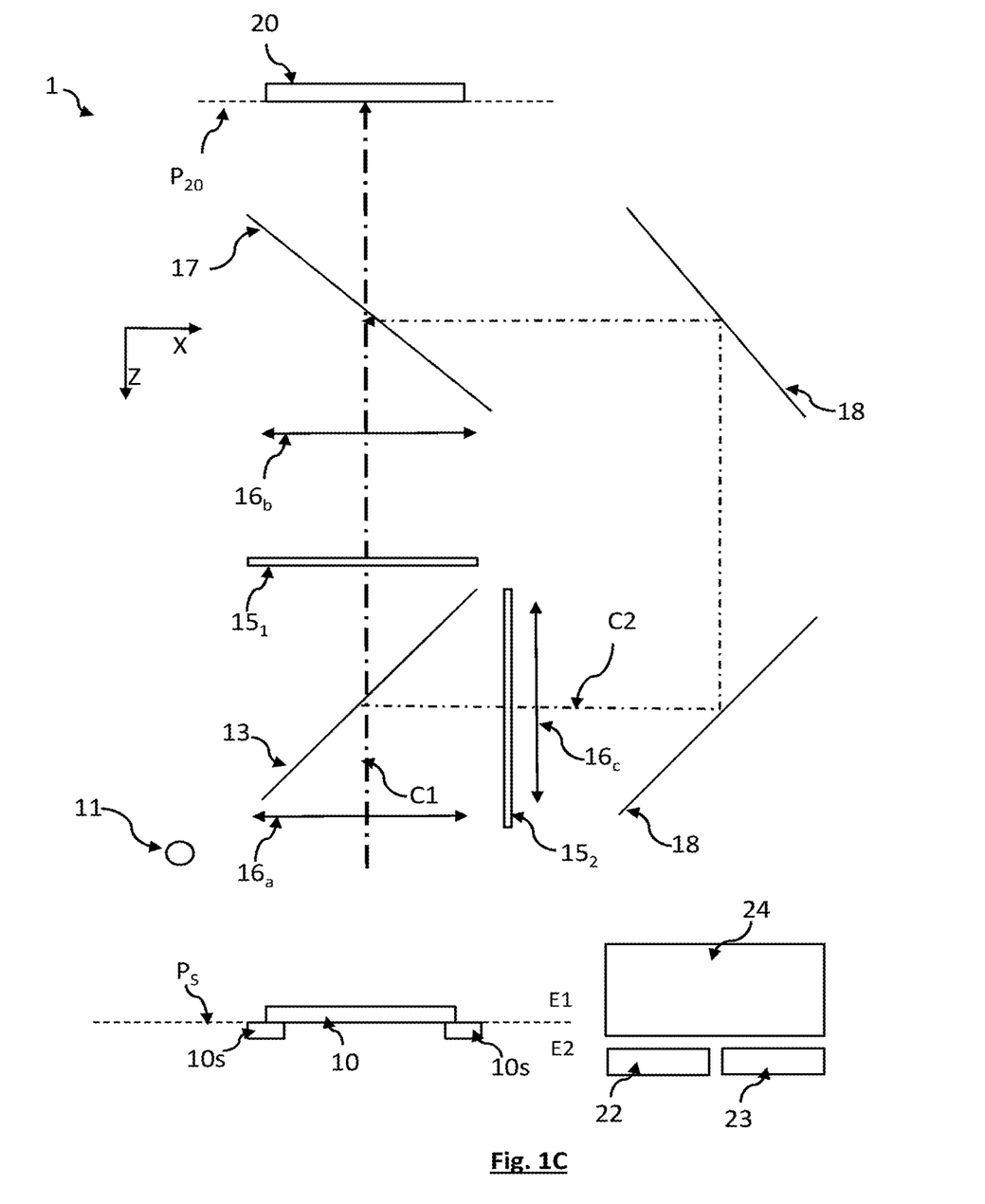
FIG. 1C shows an example of a device according to the invention, in a reflective configuration.

According to one variant shown in FIG. 1B, the second splitter 17:
reflects all or some of the first component $14_1$ of the light wave of interest 14 to the image sensor 20;
transmits all or some of the second component $14_2$ of the light wave of interest 14 to the image sensor 20.

Thus, downstream of the second splitter 17, the first and second components of the light wave of interest propagate to the image sensor 20 along the same propagation axis, in the present case the axis X.

The device 1 defines, between the first splitter 13 and the second splitter 17:
a first optical channel C1, which in this example lies parallel to the axis Z, and through which the first component $14_1$ of the light wave of interest 14 propagates;
a second optical channel C2, through which the second component $14_2$ of the light wave of interest 14 propagates.

In the examples shown in FIGS. 1A to 1D, the second optical channel C2 is formed by mirrors 18, which are arranged to reflect the second component $14_2$ of the light wave of interest 14 from the first splitter 13 to the second splitter 17 in such a way that it does not pass through the first optical system $16_1$. In other words, the second optical channel C2 bypasses the first optical system $16_1$.

Generally:
the first optical channel $C_1$ is configured to spectrally filter the first component $14_1$ of the light wave of interest, in the first spectral band $\Delta_1$, and to magnify the first component $14_1$ by a first magnification $G_1$;
the second optical channel $C_2$ is configured to spectrally filter the second component $14_2$ of the light wave of interest, in the second spectral band $\Delta_2$, and to magnify the second component $14_2$ by a second magnification $G_2$.

Because of the spectral filtering carried out by the first filter $15_1$ and by the second filter $15_2$, when the first and second components of the light wave of interest 14 reach the second splitter 17 they lie in the first spectral band $\Delta_1$ and in the second spectral band $\Delta_2$, respectively.

The image sensor 20 is placed downstream of the second splitter 17. It receives the first and second components of the light wave of interest 14. The image sensor is a polychromatic sensor comprising a matrix array of pixels. It is for example a question of a CCD or CMOS sensor. The pixels are placed in a detection plane $P_{20}$. As shown in FIG. 1E, the image sensor comprises a first group of pixels $20_1$, which are sensitive to the first spectral band $\Delta_1$, and a second group of pixels $20_2$, which are sensitive to the second spectral band $\Delta_2$. The image sensor may comprise other groups of pixels, which will be sensitive to a spectral band different from the first spectral band $\Delta_1$ and from the second spectral band $\Delta_2$. The first group of pixels $20_1$ is considered to not be sensitive to the second spectral band $\Delta_2$. Likewise, the second group of pixels $20_2$ is considered to not be sensitive to the first spectral band $\Delta_1$. For example, the image sensor 20 comprises a Bayer filter, so that the first group of pixels $20_1$ is sensitive to the red spectral band and so that a second group of pixels $20_2$ is sensitive to the blue spectral band. It then comprises a third group of pixels, which are sensitive to the green spectral band, and which is not used. Preferably, the first group of pixels $20_1$ is at least 5 to 10 times more sensitive to the first spectral band $\Delta_1$ than to the second spectral band $\Delta_2$. Reciprocally, the second group of pixels $20_2$ is at least 5 to 10 times more sensitive to the second spectral band $\Delta_2$ than to the first spectral band $\Delta_1$.

The image sensor 20 is placed at a distance equal to the first focal length (75 mm) from the first optical system $16_1$ and at a distance equal to the second focal length (200 mm) from the second optical system $16_2$. It will be understood that use of a first optical channel $C_1$ and of a second optical channel $C_2$ allows the image sensor 20 to be placed at a distance equal to the first focal length from the first optical system $16_1$ and at a distance equal to the second focal length from the second optical system $16_2$. The distance between the image sensor and each optical system is adjusted depending on their respective focal length.

Each image I acquired by the image sensor may simultaneously contain:
information on the first component $14_1$ of the light wave of interest, in the first spectral band $\Delta_1$, distributed over the first group of pixels $20_1$;
information on the second component $14_2$ of the light wave of interest, in the second spectral band $\Delta_2$, distributed over the second group of pixels $20_2$.

The image sensor is connected to a processing unit 22, a microprocessor for example, said processing unit being connected to a memory 23 and to a display 24. The processing unit 22 or the image sensor 20 is configured to form a first image $I_1$, from the information collected by the first group of pixels $20_1$. The first image $I_1$ allows the sample to be observed at the first magnification $G_1$. The processing unit 22 or the image sensor 20 is configured to form a second image $I_2$, from the information collected by the second group of pixels $20_2$. The second image $I_2$ allows the sample to be observed at the second magnification $G_2$.

Thus, the first optical channel $C_1$ allows the image sensor 20 to form a first image $I_1$ of the sample, in the first spectral band $\Delta_1$. This allows the sample 20 to be imaged at the first magnification $G_1$. The second optical channel $C_2$ allows the image sensor 20 to form a second image $I_2$ of the sample, in the second spectral band. This allows the sample to be imaged at the second magnification $G_2$.

Thus, the invention allows, with one and the same image sensor, two images of the sample to be simultaneously formed respectively at two different magnifications without moving the sample or any of the component elements of the device: neither the image sensor, nor the sample, nor the optical systems are moved. This is due to the fact that the two images $I_1$ and $I_2$ are formed from the same acquired image I. In the example given above, the first magnification $G_1$ is lower than the second magnification $G_2$. Thus, in a first image $I_1$ that field of observation will be privileged whereas in the second image $I_2$ the observation of details in the field of observation of the first image $I_1$ will be privileged.

The simultaneous formation of two images is one preferred embodiment. It is not however necessary for the two images to be formed from the same acquired image I. The two images may be formed from images I acquired sequentially if the sample is illuminated sequentially in all or some of the first spectral band $\Delta_1$ or of the second spectral band $\Delta_2$.

According to one embodiment, which is shown in FIG. 10, the sample 10 is observed in a reflective configuration. In this configuration, the light source 10 is placed in the same half-space E1 as the image sensor 20, the half-space being limited by the holder plane $P_S$. In this embodiment, the sample is either reflective, or placed on a reflective holder. When the sample is reflective, the reflection may be obtained at the surface of the sample, or in the interior of the latter by backscattering. Thus, the light wave of interest 14, to which the image sensor 20 is exposed, is a wave that is reflected either from the surface of the sample, or in the sample, or by the reflective holder 10s on which the sample is placed.

Figure 1D:
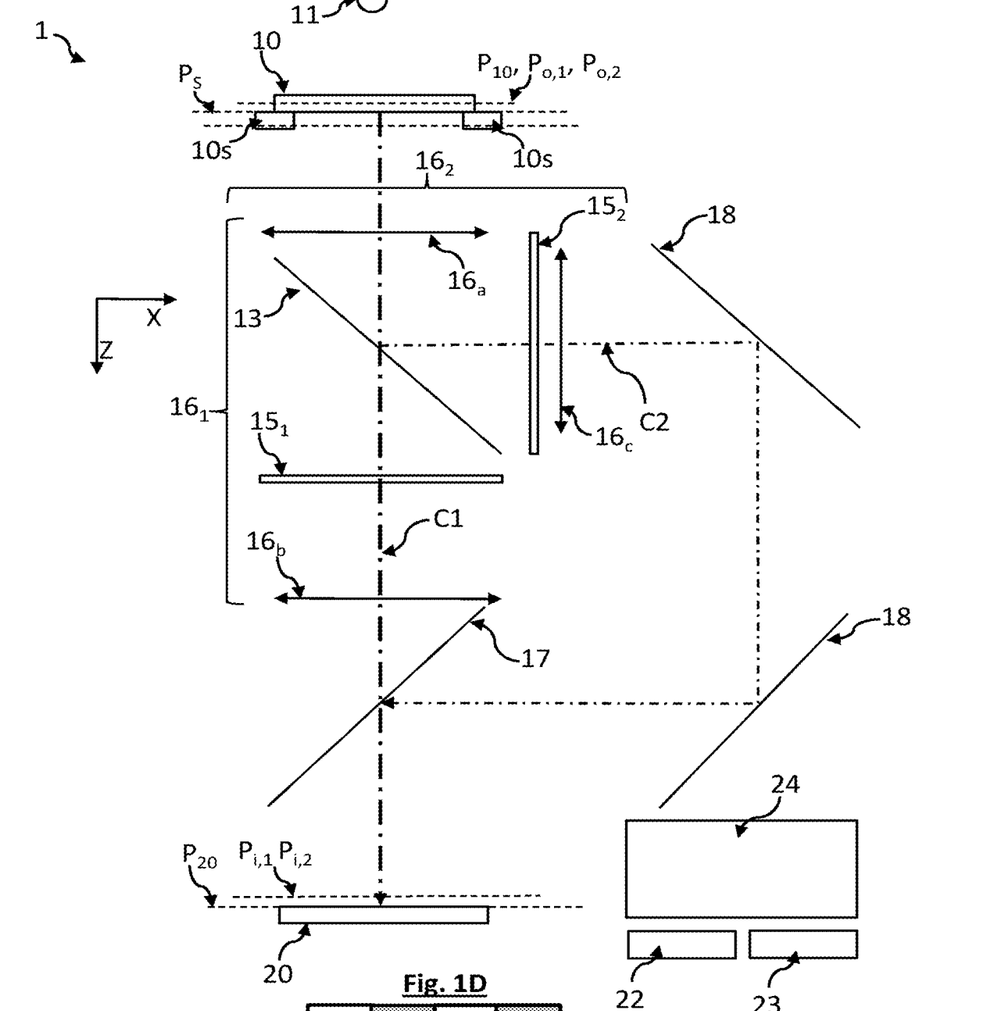
FIG. 1D is a variant of the configuration shown in FIG. 1A.
Figure 1E:
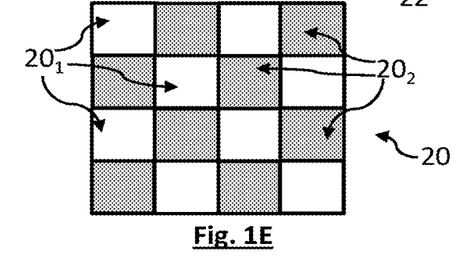
FIG. 1E is a representation of an image sensor.

According to one embodiment, which is shown in FIG. 1D, the first and/or second image(s) are acquired in a defocused configuration. Each optical system $16_1$ or $16_2$ respectively defines an image plane and an object plane. In a focused configuration, the object plane corresponds to a plane $P_{10}$ in which the sample 10 lies and the image plane corresponds to the detection plane $P_{20}$ defined by the image sensor. In the defocused configuration:

the image plane $P_{i,1}$ of the first optical system $16_1$ is offset from the detection plane $P_{20}$ by a first image defocus distance $d_{i,1}$, and/or the object plane $P_{o,1}$ of the first optical system is offset from the sample plane $P_{10}$ by a first object defocus distance $d_{o,1}$;

and/or the image plane $P_{i,2}$ of the second optical system $16_2$ is offset from the detection plane $P_{20}$ by a second image defocus distance $d_{i,2}$, and/or the object plane $P_{o,2}$ of the second optical system is offset from the sample plane $P_{10}$ by a second object defocus distance $d_{o,2}$.

In the example shown in FIG. 1D only the first and second image planes $P_{i,1}$ and $P_{i,2}$ are offset with respect to the detection plane $P_{20}$. The first and second object planes $P_{o,1}$ and $P_{o,2}$ correspond to the plane $P_{10}$ in which the sample 10 lies.

Generally, the defocus distance is smaller than 1 mm, and preferably smaller than 500 μm or even 100 μm. A slightly defocused configuration may be spoken of. Such a defocus is appropriate for the observation of transparent particles, images of transparent particles taken in a focused configuration being unusable.

An image obtained in a defocused configuration may form the subject of a holographic reconstruction. It is a question of applying a holographic propagation operator h that models the propagation of the light between the detection plane $P_{20}$ and a reconstruction plane, so as to obtain a complex expression A of the light wave of interest in question, whether it be the first component $14_1$ of the light wave of interest or the second component $14_2$ of the light wave interest. This may in particular allow a phase image of the light wave of interest in question to be obtained. An example of a holographic propagator h is a Fresnel operator, namely:

$$h(x, y, d) = \frac{1}{j\lambda z} e^{j2\pi \frac{z}{\lambda}} \exp\left(j\pi \frac{x^2 + y^2}{\lambda d}\right)$$

x, y designating coordinates in the detection plane $P_{20}$;
d is a distance between the detection plane $P_{20}$ and the reconstruction plane;
j is such that $j^2 = -1$.

Preferably, it is possible to obtain a complex image $I^*$ of the light wave in question. The complex image corresponds to a spatial distribution of the complex expression A of the light wave in the reconstruction plane.

For example, if the first optical system $16_1$ is placed in a defocused configuration, a defocused first image $I_1$, which shows the first component $14_1$ of the light wave of interest, is obtained. It is possible to obtain a reconstructed complex first image $I_1^*$ by convoluting the first image $I_1$ with the operator:

$$I^*_1 = I_1 * h$$

The reconstructed first image $I_1^*$ shows the first component of the light wave of interest $14_1$ in the reconstruction plane. The reconstruction plane may for example be the plane $P_{10}$ in which the sample lies. It is thus possible to form a phase image of the sample, by computing the argument of the first complex image $I_1^*$.

The above is also valid when the second optical system $16_2$ is placed in a defocused configuration. From the second image $I_2$, it is possible to obtain a complex second image $I_2^*$ such that:

$$I^*_2 = I_2 * h$$

A complex image may be obtained, from an image acquired in a defocused configuration, by applying elaborate reconstruction algorithms. Such algorithms are for example described in WO2017162985.

From a complex image, obtained by holographic reconstruction, it is possible to obtain an exploitable image of the sample via an image established on the basis of the modulus or of the phase of the real part or of the imaginary part of the complex image.

A device such as that shown in FIG. 1A has been employed using, by way of sample 10, a transparent reticle comprising opaque marks. The objective $16_a$ was an Motic 10× objective of 0.25 numerical aperture. The tube lenses $16_b$ and $16_c$ were as described above. The image sensor 20 was a CMOS RGB IDS UI-3160CP-C-HQ 1920×1200 pixel sensor of 4.8 μm pixel size. The light source 11 was a white LED.

Figure 2A:
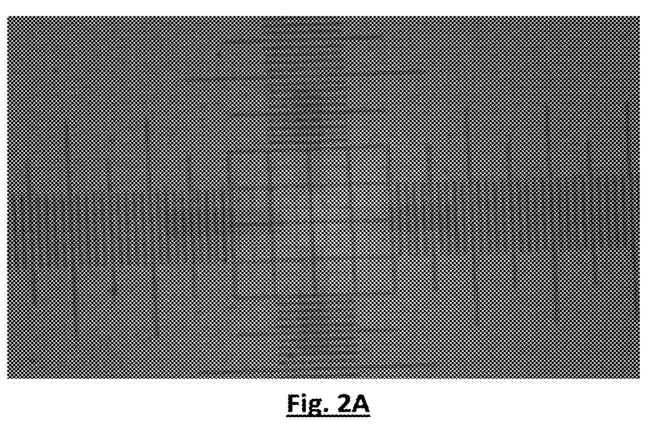
FIG. 2A shows an example of an image acquired using a device such as shown in FIG. 1A, the observed sample being a reticle.

FIG. 2A shows an image acquired by the image sensor 20, converted into black-and-white. This image simultaneously contains the pixels of the first group of pixels $20_1$, forming the first image $I_1$, juxtaposed with the pixels of the second group of pixels $20_2$, forming the second image $I_2$.

Figure 2B:
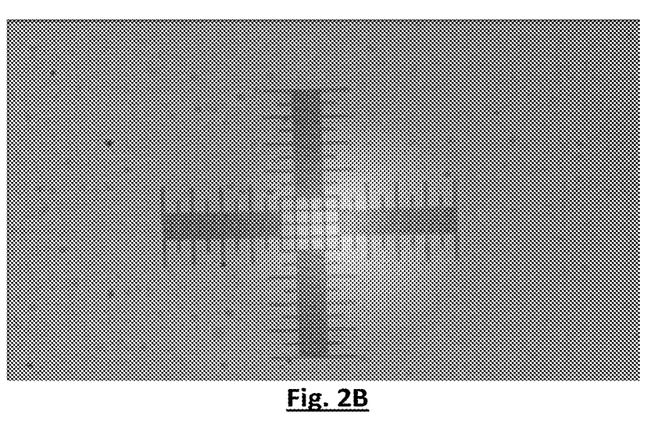
FIG. 2B is a first image, formed from a first group of pixels of the image shown in FIG. 2A.
Figure 2C:
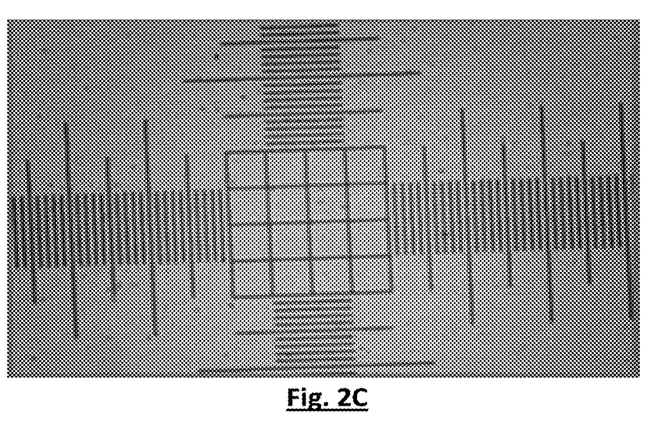
FIG. 2C is a second image, formed from a second group of pixels of the image shown in FIG. 2A.

FIG. 2B corresponds to the first image $I_1$, formed solely from the pixels of the first group of pixels $20_1$. The reticle may be seen at a first magnification $G_1$. FIG. 2C corresponds to the second image $I_2$, formed solely from the pixels of the second group of pixels $20_2$. The reticle may be seen at a second magnification $G_2$, the latter being higher than the first magnification.

The device was employed with a sample containing spermatozoa. As is known, characterization of spermatozoa is a commonplace application. Document WO2014021031 for example describes an example of tracking of the movement of spermatozoa by lensless imaging. The analysis of spermatozoa assumes the path of each spermatozoon is tracked, so as to determine the type of path and/or the speed of movement. This requires a large field of observation, if it is desired to avoid moving the image sensor or the sample. The analysis of spermatozoa may also comprise an analysis of the morphology of the observed spermatozoa, or certain thereof. It is then a question of detecting potential morphological anomalies, for example a malformation. This assumes a precise representation of the spermatozoa, with a high magnification.

During this trial, images I were acquired at a high acquisition frequency, comprised between 60 Hz and 100 Hz, using the image sensor 20, so as to allow the path of the spermatozoa to be tracked, in particular using first images $I_1$ formed from each acquired image I. The first images $I_1$ had a large field of observation, of the order of 3 mm². From each acquired image I, second images $I_2$, allowing the morphology of the spermatozoa to be observed individually, were formed. The field of observation corresponding to each second image $I_2$ was 0.4 mm². In order to obtain a better rendering, the second optical system $16_2$ was placed in a slightly defocused configuration, the image plane $P_{I,2}$ of the second optical system being defocused by 5 μm with respect to the detection plane $P_{20}$. Since the defocus distance was small, there was no need to apply a holographic reconstruction operator.

Figure 3A:
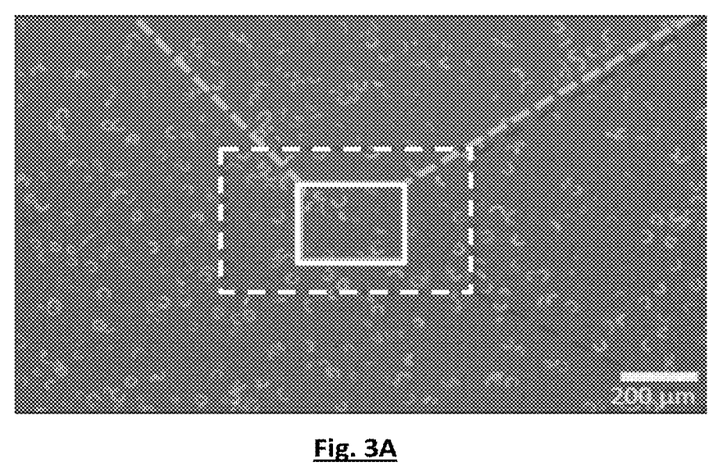
FIG. 3A shows a first image, formed from an image acquired by a device such as shown in FIG. 1A. The observed sample is a liquid medium containing spermatozoa.
Figure 3B:
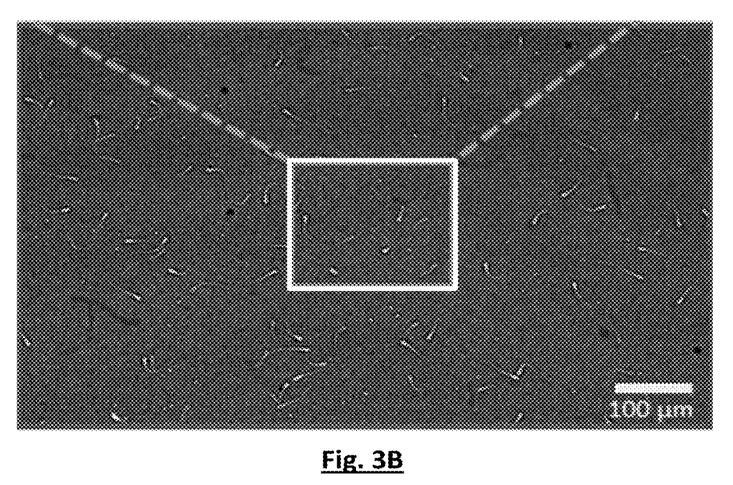
FIG. 3B shows a second image of the sample containing spermatozoa, said image being formed from an image acquired by a device such as shown in FIG. 1A.
Figure 3C:
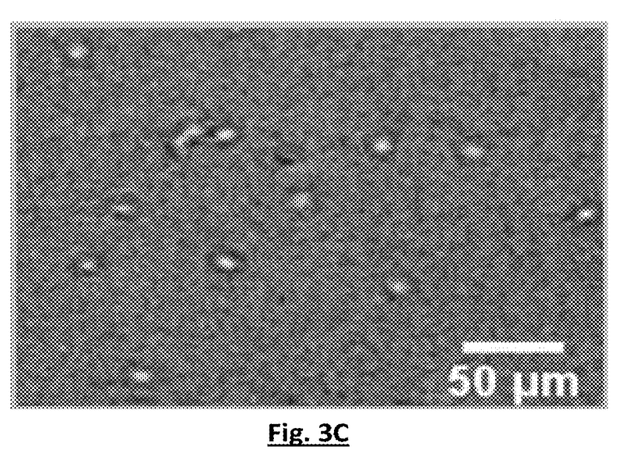
FIG. 3C is a detail of FIG. 3A.
Figure 3D:
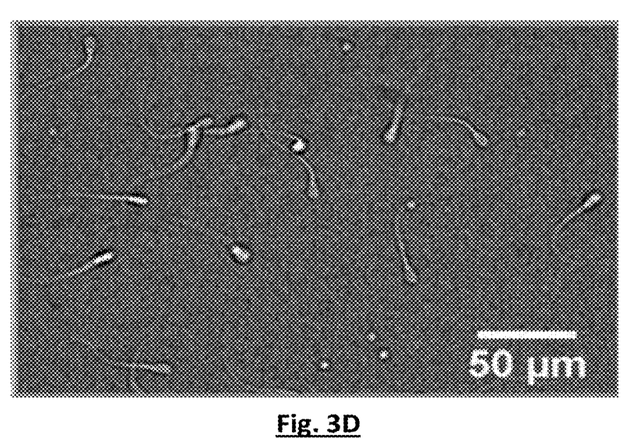
FIG. 3D is a detail of FIG. 3B.

FIG. 3A is an example of a first image $I_1$ formed from an image acquired by the image sensor. Each spermatozoon appears in the form of a trace, this allowing the location thereof to be determined with sufficient precision. FIG. 3C is a view of the region of interest framed by a solid rectangle in FIG. 3A. It shows that the position of the spermatozoa may be precisely determined. Thus, the first image $I_1$ allows the path of the spermatozoa to be tracked, when a plurality of images are acquired sequentially. The region of interest shown in FIG. 3A by the dashed rectangle corresponds to the field of observation of the second image $I_2$. FIG. 3B is an example of a second image $I_2$ formed from an image acquired by the image sensor. FIG. 3D is a view of the region of interest framed by the solid rectangle. The second image $I_2$ allows each spermatozoon to be imaged with sufficient precision for the morphology thereof to be analyzed. The invention thus allows the path and morphology of spermatozoa to be characterized simultaneously.

The field of application of the invention is not limited to the observation of spermatozoa and may be applied to any other type of cell, and, more generally, to the characterization of any type of particle moving in a medium, whether it be a question of a liquid or gaseous medium. Apart from biology or use in diagnostics, the invention may be applied to other fields, for example, and non-exhaustively, food processing, the inspection of fluids or the monitoring of processes.

The invention claimed is:

1. A device for observing a sample, comprising:
   a light source configured to emit an incident light wave in a first spectral band and in a second spectral band, the first spectral band being different from the second spectral band;
   an image sensor comprising a first group of pixels, which are sensitive to the first spectral band, and a second group of pixels, which are sensitive to the second spectral band;
   a holder configured to hold the sample in a holder plane, the holder plane lying between the light source and the image sensor, such that when the sample is held by the holder, under the effect of an illumination by the incident light wave, a light wave of interest propagates to the image sensor, the light wave of interest being the result of the propagation of the incident light wave through the sample or from reflection of the incident light by the sample;
   a first splitter, placed between the holder plane and the image sensor, so as:
      to transmit a first component of the light wave of interest through a first optical channel, the first optical channel extending to a second splitter;
      to reflect a second component of the light wave of interest to a second optical channel that is different from the first optical channel, the second optical channel extending to the second splitter;
   a first filter and a second filter, which are placed downstream of the first splitter in order to filter the first component in the first spectral band and the second component in the second spectral band, respectively;
   a first optical system, which defines a first magnification and which at least partially lies in the first optical channel, and a second optical system, which defines a second magnification and which at least partially lies in the second optical channel;
   the second splitter being placed between the first splitter and the image sensor, and arranged so as to recombine the first component and the second component, such that downstream of the second splitter, the first component and the second component propagate to the image sensor parallel to one and the same propagation axis;
   wherein the first magnification is strictly higher or strictly lower than the second magnification.

2. The device according to claim 1, comprising a processing unit programmed to form:
   a first image from the first group of pixels;
   a second image from the second group of pixels.

3. The device according to claim 1, comprising an infinity corrected objective placed between the holder plane and the first splitter, and:
   a first tube lens lying in the first optical channel, the first tube lens forming, with the infinity corrected objective, the first optical system;
   a second tube lens lying in the second optical channel, the second tube lens forming, with the infinity corrected objective, the second optical system.

4. The device according to claim 1, wherein the first splitter comprises a half-silvered mirror and/or wherein the second splitter comprises a half-silvered mirror.

5. The device according to claim 1, wherein the second optical channel comprises mirrors, so as to direct the second component, i.e. the component reflected by the first splitter, to the second splitter.

6. The device according to claim 1, wherein the holder plane defines two half-spaces, such that:
   the light source and the image sensor belong to two different half-spaces, respectively;
   or the light source and the image sensor belong to the same half-space.

7. A method for observing a sample using a device according to claim 1, the method comprising:
   placing the sample on the holder;
   illuminating the sample using the light source;
   acquiring an image with the image sensor;
   from the acquired image, forming a first image of the sample using the first groups of pixels, and forming a second image of the sample using the second group of pixels;
such that
   the first image shows the sample at the first magnification defined by the first optical system;
   the second image shows the sample at the second magnification defined by the second optical system.

8. The method according to claim 7, wherein:
   the first optical system defines a first object plane and a first image plane, and wherein the sample lies in a sample plane;
   the image sensor defines a detection plane;
the method being such that:
   the sample plane is offset with respect to the first object plane by a first object defocus distance smaller than 1 mm;
   and/or the detection plane is offset with respect to the first image plane by a first image defocus distance smaller than 1 mm;
such that the first image is a defocused image of the sample.

9. The method according to claim 7, also comprising reconstructing a complex image of the first component from the defocused first image.

10. The method according to claim 7, wherein:
the second optical system defines a second object plane and a second image plane, and wherein the sample lies in a sample plane;
the image sensor defines a detection plane;
the method being such that:
the sample plane is offset with respect to the second object plane by a second object defocus distance smaller than 1 mm;
and/or the detection plane is offset with respect to the second image plane by a second image defocus distance smaller than 1 mm;
such that the second image is a defocused image of the sample.

11. The method according to claim 10, also comprising reconstructing a complex image of the second component from the defocused second image.

12. The method according to claim 11, wherein the light source simultaneously emits an incident light wave in the first spectral band and in the second spectral band, such that the first image and the second image are formed simultaneously from one and the same image acquired by the image sensor.

13. The method according to claim 7, wherein the light source successively emits an incident light wave in the first spectral band and in the second spectral band, such that the first image and the second image are formed successively from two images successively acquired by the image sensor.

* * * * *